Patented July 22, 1947

2,424,458

UNITED STATES PATENT OFFICE 2,424,458

EMULSIONS FOR PAINTING AND VARNISHING PURPOSES

Gustaf Bristol Heijmer, Enebyberg, Sweden

No Drawing. Application November 15, 1943, Serial No. 510,397. In Sweden December 12, 1942

7 Claims. (Cl. 260—22)

The present invention relates to emulsions of the type water-in-oil, intended for painting purposes.

It is previously known to prepare emulsions for painting purposes by the aid of emulsifiers. Such known emulsion-paints, however, have been of the type oil- (or, generally speaking, binder) in-water. Paints of this known type, i. e. in which the continuous phase consists of water, will yield dull to semi-glossy surfaces which are well suited to a number of uses. For painting of, e. g., doors, furniture, kitchen-interiors and similar objects they are, however, less suitable since the surface will too easily become dirty. For these latter purposes a smooth and glossy film of paint is necessary. Such glossy films may also be obtained with emulsion-paints, but the emulsion must in such cases be of the type water-in-oil, i. e. the water in this case forms the discontinuous phase while the continuous phase contains the oil. The water-in-oil emulsions intended for painting purposes can not be thinned with water but may be thinned with organic solvents and diluents such as turpentine, petroleum distillates, oils, varnishes. Paints prepared from such water-in-oil emulsions will, according to the character of the binder, its composition and treatment (e. g., heating, blowing and other known treatments) yield a glossy film of the same appearance as that obtained with ordinary oil paints or lacquers. The advantages of a water-in-oil emulsion-paint over a paint exclusively prepared on the basis of organic solvents is, in addition to a saving of "thinners," a highly improved facility of handling, particularly in regard to its brushing qualities, which i. a. makes it possible to extensively employ so called synthetic paints, i. e. paints prepared on the basis of alkyd-resins, for house and interior painting work. For technical reasons such paints, however, have so far only in exceptional cases been able to apply to these latter purposes.

It has now been discovered, that water-in-oil emulsions for painting purposes may with advantage be prepared from so called tall resin oil ("cokill oil") or its chief components.

"Tall oil" or "tall acid" is the common name for the crude product obtained by acidifying so called sulfate soap ("liquid resin" or "sulfate resin"), a well known by-product from the sulfate pulp process. When this tall oil or tall acid (the latter expression being more correct since the product chiefly consists of resinous and fatty acids) is distilled in vacuum, four main products are obtained namely:

(a) A "first run" or "initial fraction," called "tall resin oil" (sometimes also cokill oil, since its chief use hitherto has been for lubricating the inside of ingot molds, so called cokills) and consisting of about 50% of unsaponifiable oil-like matter, so called neutral oil, and for the rest mainly of fatty acids;

(b) A liquid product chiefly consisting of fatty acids, sometimes called tall oil or distilled tall oil; according to modern nomenclature called "tall fat acid" (vide: Svensk Papperstidning, 1942, page 203, English summary);

(c) A solid rosin-like fraction, earlier called sulfate resin, now called "tall resin acid" and chiefly consisting of abietic acid; and (d) A distillation residue called "tall pitch."

The ingredient used according to the present invention is the product mentioned under (a) called "tall resin oil," or a fraction thereof consisting substantially of the "neutral oil" or unsaponifiable component. It has namely proved possible to prepare emulsions of the type water-in-oil using this latter component separately, or mixed with tall resin oil, although the obtained results have not as a rule exceeded those obtained by the use of tall resin oil alone. When using larger proportions of tall resin oil in the emulsion at least part of the oil should suitably be esterified or hardened with lime in a manner known per se.

According to the invention the continuous phase of the emulsions is thus based on tall resin oil or a fraction derived therefrom, to which is added a film-forming vehicle, that is, lacquer forming bodies containing at least 20% by weight of drying oil, such as modified alkyd resins, drying oils (such as linseed oil, wood oil, esterified tall fat acid), or both. In addition to these components other in oil paints commonly used ingredients, such as pigments, thinners etc. are employed to obtain a paint of the desired character. A suitable way to prepare the emulsion-paints according to the invention is to form a solution by dissolving one or several modified alkyd resins or drying oils, or both resins and drying oils of above mentioned kind in tall resin oil, with or without extra addition of organic solvents, suitably by warming the mixture, after which this is emulsified with water in such a manner that the water enters as the discontinuous phase. The emulsion is afterwards treated in a manner known per se in the preparing of oil paints to obtain the desired product.

As examples of compounding and preparing paints according to the invention, the following may be mentioned without in any way limiting the scope of the patent:

*Example 1*

| | Parts by weight |
|---|---|
| A modified phthalic acid-glycerin resin containing not less than 20% by wt. of drying oil | 200–500 |
| An organic solvent, e. g. turpentine | 50–250 |
| Tall resin oil | 50–250 | are warmed to about 100° C. and thereby brought to form a solution after which 50-500 parts by wt. of water is added while stirring. The emulsification is effected in the usual manner, e. g., in a colloid mill.

*Example 2*

| | Parts by weight |
|---|---|
| A modified alkyd resin as in Example 1 | 100-250 |
| One or several drying oils such as linseed oil, wood oil, esterified tall oil (tall fat acid) with or without addition of a smaller or larger percentage of varnish | 100-500 |
| Tall resin oil | 50-500 |
| An organic thinner (e. g. turpentine, mineral spirits etc.) | 50-300 |
| Water | 50-500 | are dissolved together and emulsified as in Example 1. From 500 to 3000 parts by wt. of pigment, e. g., lithopone, are added and the paint and emulsion combined in mixers or mills in the usual way.

*Example 3*

200-500 parts by wt. of blown oil, e. g. linseed oil 50-250 parts by wt. each of organic thinner, tall resin oil, and water are worked up to an emulsion and 500-3000 parts by wt. of pigment, e. g. lithopone, added and milled in the usual way to form a paint.

It is evident from the above specific examples that the oil paint base of the present invention, in the form of an emulsion of the water-in-oil type, may comprise from 200 to 750 parts of a film-forming vehicle containing at least 20 per cent of a drying oil, 50 to 300 parts of an organic thinner, 50 to 500 parts of tall resin oil and from 50 to 500 parts of water. From 500 to 3000 parts of a pigment may be incorporated if desired.

The broad term "paint" in the specification includes transparent as well as pigmented products (varnishes, paints, enamels and lacquers) prepared on the basis of emulsions of the type described.

I claim:

1. Water-in-oil emulsions suitable for use as varnishes and paints, the continuous phase of which comprises a component selected from a class consisting of tall resin oil and a fraction of tall resin oil consisting substantially of unsaponifiable oil-like matter, a film-forming vehicle containing at least 20 per cent by weight of drying oil and a sufficient quantity of water-insoluble organic solvents to form a brushable coating composition, the discontinuous phase consisting principally of water; said tall resin oil being the initial fraction, containing about 50 per cent of unsaponifiable oil-like matter and a balance mainly of fatty acids, obtained by acidifying and distilling in vacuum the sulfate soap of the sulfate pulp process.

2. Water-in-oil emulsions suitable for use as varnishes and paints, the continuous phase of which comprises a component selected from a class consisting of tall resin oil and a fraction of tall resin oil consisting substantially of unsaponifiable oil-like matter; drying-oil modified alkyd resins containing at least 20 per cent by weight of drying oil, and a sufficient quantity of water-insoluble organic solvents to form a brushable coating composition, the discontinuous phase consisting principally of water; said tall resin oil being the initial fraction, containing about 50 per cent of unsaponifiable oil-like matter and a balance mainly of fatty acids, obtained by acidifying and distilling in vacuum the sulfate soap of the sulfate pulp process.

3. Water-in-oil emulsions suitable for use as varnishes and paints, the continuous phase of which comprises tall resin oil, a drying oil and a sufficient amount of a water-insoluble organic thinner to form a brushable consistency, the discontinuous phase consisting principally of water; said tall resin oil being the initial fraction, containing about 50 per cent of unsaponifiable oil-like matter and a balance mainly of fatty acids, obtained by acidifying and distilling in vacuum the sulfate soap of the sulfate pulp process.

4. An oil paint base in the form of an emulsion of the type water-in-oil comprising by weight from 200 to 750 parts of a film-forming vehicle containing at least 20 per cent of a drying oil, from 50 to 300 parts of a water-insoluble organic thinner, from 50 to 500 parts of tall resin oil and from about 50 to 500 parts of water; said tall resin oil being the initial fraction, containing about 50 per cent of unsaponifiable oil-like matter and a balance mainly of fatty acids, obtained by acidifying and distilling in vacuum the sulfate soap of the sulfate pulp process.

5. The oil paint base of claim 4 wherein the film-forming vehicle comprises a drying-oil-modified alkyd resin.

6. The oil paint base of claim 4 wherein from about 500 to 3000 parts by weight of a pigment are incorporated.

7. A process of preparing an emulsion of the type water-in-oil for painting and varnishing purposes, which comprises heating together a drying-oil-modified alkyd resin, a drying oil and tall resin oil to form a solution, adding water to said solution while agitating to form an emulsion and adding thinning and pigmenting components to form a coating composition; said tall resin oil being the initial fraction, containing about 50 per cent of unsaponifiable oil-like matter and a balance mainly of fatty acids, obtained by acidifying and distilling in vacuum the sulfate soap of the sulfate pulp process.

GUSTAF BRISTOL HEIJMER.

REFERENCES CITED

The following references are of record in the file of this patent:

UNITED STATES PATENTS

| Number | Name | Date |
|---|---|---|
| 2,332,939 | Schmitz | Oct. 26, 1943 |
| 2,326,120 | Black | Aug. 10, 1943 |
| 2,291,616 | Fletcher | Aug. 4, 1942 |
| 2,183,227 | Scholz | Dec. 12, 1939 |

OTHER REFERENCES

Lignin Liquors and Its Uses in Protective Coatings—Alford, published in Official Digest Federated Paint and Varnish Prod. Clubs #213, Feb. 1942, pages 66 to 74.